United States Patent Office 2,868,491
Patented Jan. 13, 1959

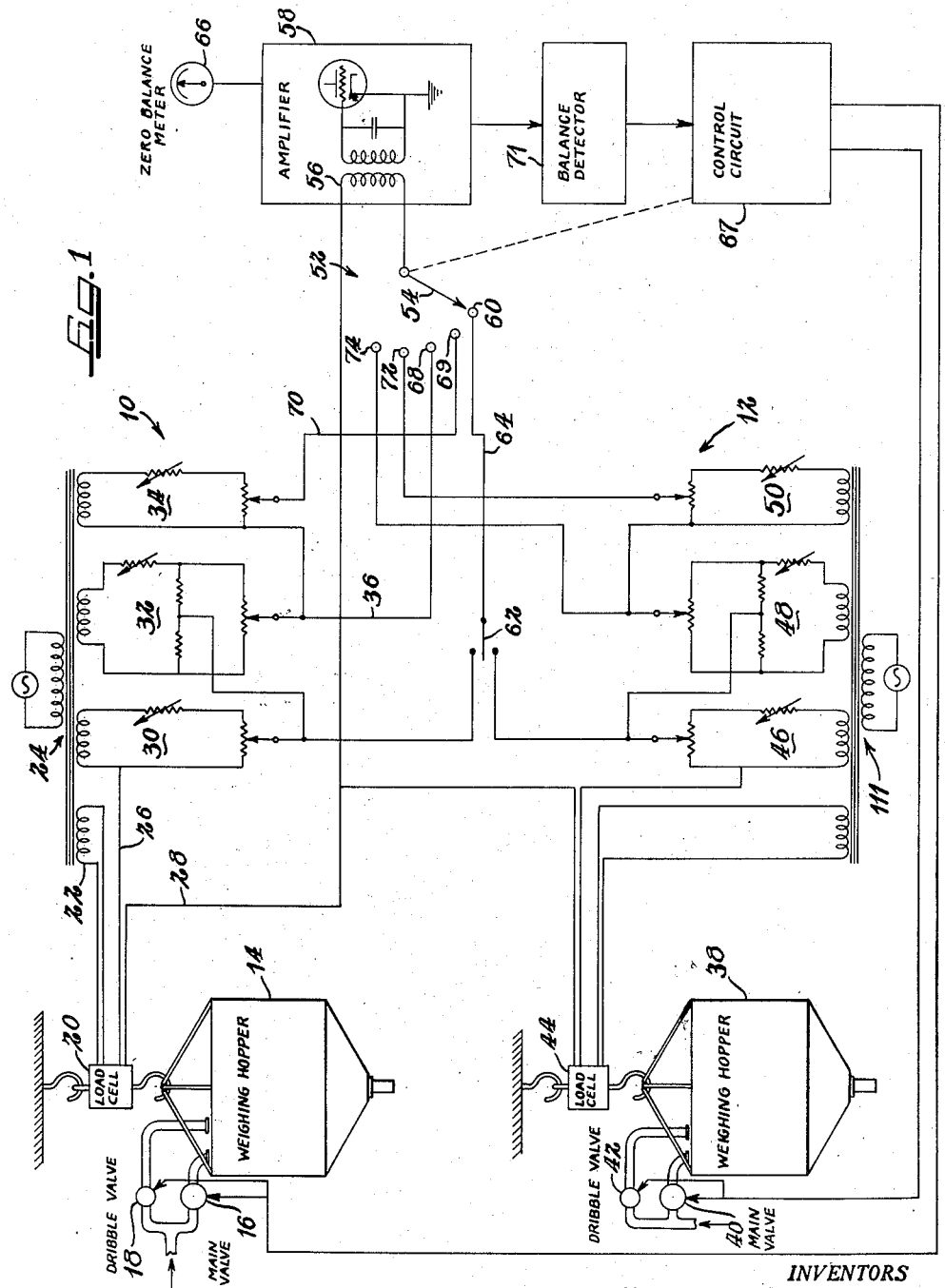

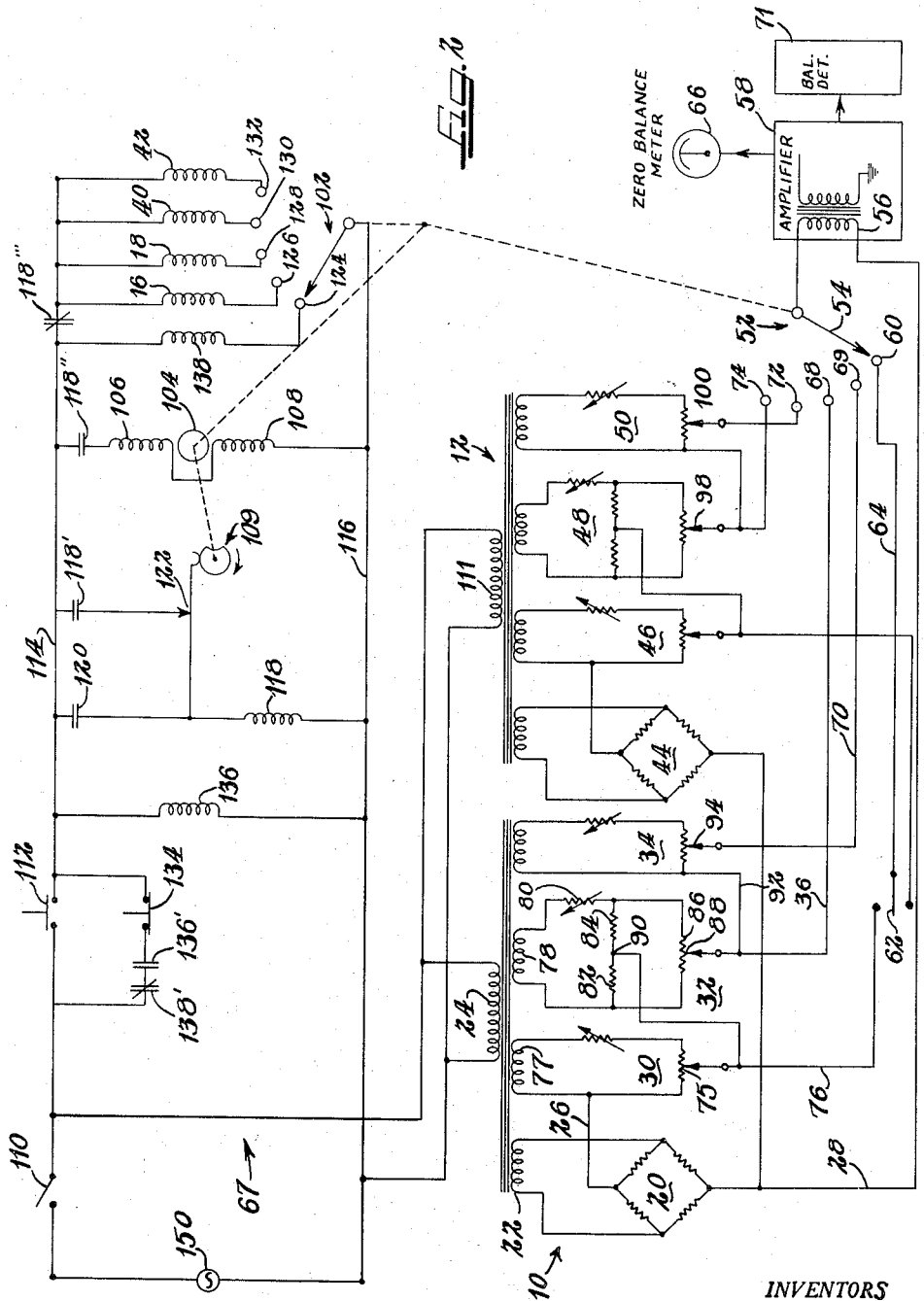

2,868,491

BATCH WEIGHER

Matthew T. Thorsson, Moline, Ill., and Louis J. Lauler, Canoga Park, Calif., assignors to Fairbanks, Morse & Co., Chicago, Ill., a corporation of Illinois Application November 1, 1955, Serial No. 544,168

6 Claims. (Cl. 249—14)

This invention relates to batch weighers and more particularly relates to a batch weigher having two or more electrical weighing systems, each operable for weighing a different ingredient, interconnected for completely automatic operation. The batch weigher of this application embodies the basic circuit arrangements for a weighing system shown in our earlier filed copending application, entitled Batch Weighing and Automatic Weighing Systems, filed on April 21, 1954, and bearing Serial Number 424,596. The disclosure of that application is hereby incorporated by reference.

Each of the electrical weighing systems of the present invention includes a container or hopper, for receiving flowable materials, supported by means of a load cell of known construction, so that the load cell is stressed by the material received in the hopper. The load cell provides an electrical network which, as the load cell is stressed, produces an output voltage the magnitude of which is dependent upon the amount of load supported by the load cell. Also included in the weighing systems is a zero balancing circuit capable of providing an adjustable voltage in opposition to the load cell voltage. The load cell normally will be subjected to an initial strain due to the weight of the hopper and other associated parts carried by the load cell, and the voltage produced by the load cell due to this initial strain will be called the tare or dead weight voltage. The opposing voltage produced by the zero balancing circuit is adjusted to a value equal to the tare or dead weight voltage of the load cell, so that the combined output voltage from the load cell and zero balancing circuit will be zero when no material is present in the hopper.

Once the balancing circuit has been so adjusted, placing material in the hopper will further stress the load cell network and produce a net cell output voltage. In series with the load cell network and zero balancing circuit is a cut-off circuit which may be adjusted to provide a predetermined voltage which is in phase opposition to the net load cell voltage. Thus the effective voltage, hereinafter called the error signal, is the difference in voltage between the net load cell voltage and the preset opposing cut-off circuit voltage. The error signal through the instrumentality of certain control apparatus governs operation of an electro-magnetically controlled valve for causing material flow to the hopper.

In operation of the automatic weighing system as thus far indicated, the cut-off circuit is initially adjusted to produce an opposing voltage equal to the net load cell voltage that will be produced by the load cell network when a desired, predetermined quantity of material has been received in the hopper. Since the error signal is the difference between the load cell voltage and opposing cut-off circuit voltage, initially the error signal will be equal to the cutoff circuit voltage because the net load cell voltage will be zero. As material flows into the hopper, thereby increasing the net load cell voltage, the error signal diminishes until it reaches zero value, when the cut-off circuit voltage and the load cell voltage are equal. The absence of an error signal brings about closure of the material flow control valve to cut off the feed of the material into the hopper, so that only the pre-selected amount of material, as determined by the adjustment of the cut-off circuit, is delivered to the hopper.

It is desirable to provide a "dribble" approach to the final cut-off of material flow. This means that the material flows into the hopper at a high rate through a main valve until it had fed a quantity of materal slightly less than the final specified amount, and then the material feeds at a reduced rate through a dribble valve until the final cut-off valve is reached. The dribble approach to cut-off is accomplished by providing a second material flow control valve, called a dribble valve, and providing a dribble circuit in series with the load cell network zero balancing circuit and cut-off circuit. Assuming by way of example that material to the extent of 400 lbs. is to be fed to the hopper, the dribble circuit may be adjusted to produce a dribble voltage equal to the load cell voltage when say 10 lbs. of material is carried by the load cell. The dribble voltage is in phase opposition to the cut-off voltage to provide an initial effective cut-off circuit voltage proportional to or representative of 390 lbs. When 390 lbs. of material are fed into the hopper, the sum of the load cell voltage and the dribble voltage equals the preset cut-off voltage resulting in a zero error signal to cause the main material supply valve to close. At the same time the dribble circuit is rendered ineffective to cause an error signal representative of 10 lbs. The dribble control valve then remains open until 10 lbs. of material flow through this valve into the hopper at a slow rate. Whereupon the load cell voltage and the cut-off circuit voltages balance to indicate that the load in the hopper is 400 lbs. and the dribble valve will close.

In the batch weigher of the present application two or more of the weighing systems described above are used, one for each ingredient that is to be weighed, and a common amplifier and an interlocking operating control circuit is provided, whereby the weighing systems are operated one after another completely automatically to weigh out the batch. The separate weighing systems with interlocking controls provide a versatile batch weigher.

In certain batching operations it frequently happens that some ingredients are to be present in the final batch in a relatively small percentage as compared to the other ingredients. For example, metal alloys often include in their formula ingredients comprising only a fraction of 1% of the total weight of the composite metal. In such a case it is not feasible to weigh all the ingredients to the required accuracy using only one weighing system, which of necessity must be of large capacity to accommodate the ingredients that are present in large amounts. Likewise, a weighing system for the ingredients of small amounts should be of low capacity to increase the accuracy with which these ingredients are measured. Consequently, to provide accurate batching, two or more weighing systems are provided, each having its capacity tailored to the required weight of a separate ingredient in the final mixture. As another example, in batchers it is frequently necessary to weigh the ingredients before they are allowed to be mixed. With the batcher of the present invention each ingredient can be weighed in the hopper of that system without affecting the other weighing system for the other ingredients.

For purposes of illustration, the batcher described in this application is provided with two separate weighing systems, but it will be evident that more weighing systems can be included without departing from the spirit or scope of the invention.

In the batch weigher of the present invention a sequential control circuit is utilized to initiate, control and stop the flow of first one ingredient and then another ingredient. The amount of each ingredient is selected by appropriately adjusting a potentiometer in the cut-off circuit of the weighing system for that particular ingredient. Operation of the batch weigher is initiated by the control circuit, and the flow control valve of the first weighing system will be opened to permit flow of the first ingredient into the weighing hopper. The opposing voltage of the cut-off circuit for the first weighing system will continue to provide an error signal for the electronic amplifier until such time as the net load cell voltage, caused by the weight of the first ingredient in the hopper of the first weighing system, equals the opposing voltage of the cut-off circuit for that weighing system. At this time, zero error signal occurs so that a balance detector relay circuit and a control circuit by means of a sequential switch arrangement will close the flow control valve of the first system, open the control valve for the second weighing system and connect the second electronic weighing system to the amplifier, while at the same time the first weighing system is disconnected from the amplifier. Thus an error signal equal to the opposing voltage of the cut-off circuit for the second weighing system will be present at the amplifier input, whereupon the common control circuit holds open the control valve for the second ingredient to permit material to flow into the weighing hopper of the second weighing system. As the second ingredient is delivered to the hopper the error signal gradually decreases until it reaches zero value, at which time the appropriate quantity of both the first and second ingredients are present in their respective weighing hoppers. When the balance detector senses the absence of an error voltage, the valve for the second ingredient is closed to end the weighing cycle.

A dribble or slow feed is achieved in the batch weigher by providing a dribble valve for each ingredient, and providing a dribble circuit in series with the load cell network, zero balancing circuit and cut-off circuit of each weighing system. As previously described, the voltage produced by the dribble circuit is in phase opposition to the voltage produced in the cut-off circuit. Thus, when the first ingredient is being fed to the hopper of the first weighing system, the dribble circuit for that weighing system is rendered effective and the first ingredient will feed rapidly until the weight of material in the hopper equals the total required amount less the amount to be delivered at the dribble rate. At this time, the error signal will be zero because the voltages produced by the load cell, zero balancing circuit, dribble circuit and cut-off circuit will balance out. The common control circuit, by means of the amplifier and balance detector, causes the main control valve of the first weighing system to close, while at the same time opening the dribble valve. Concurrently therewith, the dribble circuit is rendered ineffective so that an error signal is produced that is equal to the difference between the net load cell voltage and the opposing voltage of the cut-off circuit. As the first ingredient dribbles into its weighing hopper, the error signal will gradually diminish to zero, at which time the common control circuit closes the dribble valve for the first ingredient, opens the main supply valve for the second ingredient in the second weighing system, and connects the amplifier to the second weighing system. At this time, the dribble voltage is effective in the second weighing system, and the second ingredient feeds into its hopper at a fast rate. When all of the second ingredient except the amount to be delivered at the dribble rate is received in its hopper, a zero error condition will occur and the balance detector circuit will cause, via the control circuit, closure of the main control valve, causing the dribble valve to open, and the dribble voltage to be rendered ineffective. Thus, the last few pounds of the second ingredient will dribble into its hopper, at the end of which the weighing cycle is automatically completed.

Accordingly an object of this invention is to provide a batch weigher having an electronic weighing system for each ingredient of the batch, and a control circuit whereby the weighing systems operate to automatically produce the batch.

Another object is to provide a batch weigher, which includes separate weighing systems, each system having a voltage balancing circuit for indicating when a pre-determined amount of material has been delivered to the hopper, and which includes a control circuit for sensing the condition of the voltage balancing circuit first in one of the weighing systems and then in the other of the weighing systems to automatically control the delivery of the pre-determined amounts of material to each hopper in sequence.

A further object of this invention is the provision of a batch weigher meeting the objectives hereinbefore stated, and further providing a dribble approach to material flow-off in each weighing system.

A still further object is to provide a batch weigher having two electronic weighing systems, an amplifier and a control circuit having sequential switching apparatus to control the connection of the amplifier to the weighing systems and control the delivery of material to the hoppers of the weighing systems.

These and other objects and advantages will become more readily apparent as the following description proceeds and is read in conjunction with the accompanying drawings in which:

Fig. 1 is a diagrammatical representation partly in schematic form of the batch weigher of the present invention; and Fig. 2 is schematic diagram of the electrical circuit arrangement for the batch weigher of Figure 1.

Referring to the drawings and first to Fig. 1 thereof, two electrical weighing systems indicated by the numerals 10 and 12, are provided. Each of these systems weighs a separate ingredient of the final batch. The weighing systems are essentially alike, and weighing system 10 will first be described.

A weighing hopper 14 is arranged for receiving a first ingredient, which is delivered thereto by either a main valve 16 or a dribble valve 18. The hopper 14 is supported entirely by a load cell device 20, used in place of the usual scale lever system. The load cell 20 embodies an electrical network having power supplied by a secondary winding 22 of a transformer 24. In the manner well known in the art, an output voltage proportional to the load carried by the load cell is produced between output conductors 26 and 28 of the load cell. Hence, the material in the hopper is supported by the load cell which produces an output voltage proportional to and, therefore, representative of the weight of material in the hopper. The load cell output leads are connected in series with a zero balancing circuit indicated at 30, a cut-off circuit 32 and a dribble circuit 34. As hereinafter described, zero balancing circuit 30 is adjusted to provide a voltage in opposition to that part of the load cell voltage due to the weight of the hopper 14 and other tare weights so that only the net load cell voltage, i. e. that voltage representative of material in the hopper, is effective beyond the zero balancing circuit. Cut-off circuit 32 produces an adjustable voltage in opposition to the net load cell voltage, and the selected magnitude of this opposing voltage controls the amount of material that will be fed to hopper 14. Thus, with no material in the hopper and with the balancing circuit 30 adjusted to balance out the load cell voltage due to any tare or dead weights, and input or error voltage equal to the opposing voltage provided by cut-off circuit 32 will be present between conductor 36 and conductor 28.

The weighing system 10 further includes a dribble circuit 34 which produces a dribble voltage proportional to the number of pounds of material that is to be delivered to the hopper at the reduced dribble feed. The phase of this dribble voltage is such that it is in phase with the load cell voltage, and therefore 180° out of phase with the voltage produced by cut-off circuit 32. The dribble voltage is rendered effective or ineffective in a manner hereinafter described.

The other weighing system 12 has a weighing hopper 38, main and dribble valves 40 and 42, load cell 44, zero balancing circuit 46, cut-off circuit 48, and dribble circuit 50 all electrically connected together in a manner identical to that of weighing system 10.

A stepping switch, indicated at 52, has several fixed contacts which are connected to the weighing systems, and has a movable switch arm or blade 54 connected to the input winding 56 of an amplifier 58. The amplifier 58 is entirely conventional and for this reason its circuitry is not shown in detail. The other terminal of the amplifier input is connected to the output circuits of load cells 20 and 44. When blade 54 of stepping switch 52 engages a first fixed contact 60, one or the other of the weighing systems 10 and 12 may be zero-balanced by adjusting zero balancing circuits 30 or 46 to compensate for any tare or dead weight of the hoppers. A single pole-double throw selector switch 62 is connected over conductor 64 to fixed contact 60. When the blade of switch 62 is moved upwardly as viewed in Fig. 1, load cell 20 and zero balancing circuit 30 of weighing system 10 are connected in series with the amplifier input winding 56. Thus, with no material in the hopper and with zero balancing circuit 30 adjusted to balance out the load cell voltage due to any tare or dead weights, a signal of zero amplitude will be supplied to the amplifier. This is indicated by zero balance meter 66 which is electrically connected to the amplifier output circuit. After weighing system 10 is zero-balanced, weighing system 12 can be balanced in a similar manner by moving the blade of selector switch 62 downwardly as viewed in Fig. 1. In this condition balancing circuit 46 is adjusted to reduce the error signal to zero and compensate for any tare or dead weight in the weighing system.

The operation of the batch weigher is effected by a control circuit 67. In order to start the operation, means in control circuit 67 are actuated to move the switch blade 54 of stepping switch 52 into engagement with fixed contact 69. Contact 69 is connected over conductor 70 to dribble circuit 34 of weighing system 10. With switch 52 in this position, amplifier input winding 56 is connected in series with load cell 20, zero balancing circuit 30, cut-off circuit 32, and dribble circuit 34 so that the input signal to the amplifier is equal to the algebraic summation of the voltages produced by these circuits. In the initial condition with no material in hopper 14 and after weighing system 10 has been zero-balanced, the amplitude of the error signal at the amplifier input is equal to the amplitude of the cut-off circuit voltage less the amplitude of the dribble circuit voltage. At the same time that blade 54 of switch 52 moves into engagement with contact 69, main feed valve 16 is opened by means in the control circuit in the manner described in the above identified copending application. Thus, the first ingredient feeds into the hopper and causes the load cell voltage to increase. When enough material has been delivered to the hopper so that the load cell voltage plus the dribble voltage equals the cut-off voltage, the amplitude of the error signal at the amplifier input circuit reaches zero value. A balance detector 71 senses this voltage balance condition and in response thereto causes control circuit 67 to operate stepping switch 52 and move blade 54 sequentially into engagement with another fixed contact 68. At the same time, the control circuit closes main valve 16 and opens dribble valve 18. Fixed contact 68 is connected over conductor 36 to the cut-off circuit 32. With blade 54 engaging contact 68, the dribble circuit is rendered ineffective, and in this condition load cell 20, zero balancing circuit 30 and cut-off circuit 32 are connected in series with the amplifier input, with dribble circuit 34 being isolated. Thus, the error signal at the amplifier input is equal to the algebraic summation of the voltages produced by load cell 20, zero balancing circuit 30 and cut-off circuit 32. Since a voltage balance existed before the dribble voltage was rendered ineffective, after it is rendered ineffective, a voltage unbalance exists to an extent equal to the amount of the pre-set dribble voltage. The first ingredient will flow at a reduced rate through dribble valve 18 into the weighing hopper until another voltage balance prevails so that the error signal reaches zero value. In other words, if the dribble circuit was initially adjusted to produce a voltage representative of 10 lbs., all but 10 lbs. of the ingredient will flow into the hopper at a fast rate, and then the final 10 lbs. will be delivered to the hopper at a reduced rate.

When the second voltage balance condition is reached to indicate that the exact required amount of the first ingredient has been delivered to hopper 14, balance detector 71 is actuated again to cause stepping switch operation so that switch blade 54 is moved into engagement with fixed contact 72 of stepping switch 52. In this position of the stepping switch, load cell 44, zero balancing circuit 46, cut-off circuit 48 and dribble circuit 50 of weighing system 12 are all connected in series with input winding 56 of amplifier 58. Since no material is present in hopper 38, the error signal at the amplifier will equal the pre-set voltage of cut-off circuit 48 less the dribble voltage established in circuit 50. At this time, control circuit 67 opens main valve 40 to deliver material to the hopper 38 at a fast rate, after which voltage balance occurs to indicate that the main feed is finished. Again balance detector 71 actuates the control circuit to step blade 54 into engagement with a final contact 74. A dribble feed is then effected through valve 42 until the final weight of the ingredient is received in hopper 38. The weighing cycle is then terminated when voltage balance occurs.

For a more detailed explanation of the present invention reference may be had to Fig. 2, wherein the electrical network of the load cell 20 is shown in the form of a Wheatstone bridge supplied from secondary 22 of transformer 24. The output lead 26 is connected to the zero balancing circuit 30, while the other output lead 28 is connected to wiper 54 of switch 52 over the input winding 56 of amplifier 58. In the balancing circuit 30, current flow is provided through a potentiometer 75 by means of secondary transformer winding 77, the current flow being in such a direction as to produce a potential in opposition to the load cell voltage. Thus, as the movable contact of the potentiometer 75 is adjusted, the amount of voltage that is applied in opposition to the load cell voltage is altered. The load cell output voltage will be zero under conditions of no strain on the load cell. Since as indicated in the description of Fig. 1, load cell 20 is under an initial strain due to the weight of the hopper and other parts carried by the load cell, the zero balancing circuit 30 through adjustment of potentiometer 75 serves to render the initial dead weight voltage ineffective. Thus, with no material in the hopper and with selector switch 62 in its upper position, potentiometer 75 is adjusted until zero voltage appears between conductors 76 and 28, as indicated on meter 66.

Cut-off circuit 32 is in the form of a Wheatstone bridge and is energized from secondary winding 78 through a variable resistor 80. Two legs of the bridge are constituted by fixed resistors 82 and 84, having a common junction 90, while the other two legs are in the form of a variable tapped potentiometer 86. As the movable contact 88 of potentiometer 86 is adjusted, a voltage will be produced between the contact 88 and terminal 90, which is in phase opposition to the load cell voltage. The magnitude of this opposing or cut-off voltage is selected at a value representative of the amount of the first ingredient to be delivered to hopper 14 (Fig. 1).

The output terminal of the cut-off circuit, represented by movable contact 88 is connected over conductor 92 to dribble circuit 34, which is similar in construction to zero balance circuit 30. In circuit 34 an adjustable dribble voltage is produced between conductor 92 and contact 94 of potentiometer 96, which voltage is in phase with the voltage produced by any weight on load cell 20. It will be noted that movable contact 94 is connected to fixed contact 69 of stepping switch 52 while movable contact 88 is connected to fixed contact 68.

Weighing system 12 is similar in construction and arrangement to weighing system 10 and a description of weighing system 12 would simply be duplicative. It is sufficient to note that load cell 44, zero balancing circuit 46, cut-off circuit 48 and dribble circuit 50 are connected in series circuit arrangement, and the movable contacts 98 and 100 of the cut-off circuit 48 and dribble circuit 50 respectively are connected to fixed contacts 74 and 72 respectively of stepping switch 52.

For purposes of tare balancing as hereinbefore described, fixed contact 60 of switch 52 is connected to the armature of selector switch 62, which is in turn connected to the movable contacts of the potentiometers in zero balancing circuits 30 and 46 of the two separate weighing systems.

Operation of stepping switch 52 is effected by control circuit 67, shown in detail at the top of Fig. 2. In the control circuit the main and dribble control valves are schematically represented by solenoids 16, 18, 40 and 42. Energization of the solenoids is effected by means of the wiper of a stepping switch 102, which is mechanically connected to operate simultaneously with stepping switch 52. Operation of the stepping switches is effected by a motor 104, having control windings 106 and 108. A shaft of motor 104 is mechanically coupled to the wipers of switches 102 and 52 as indicated by the dashed lines and to the cam of microswitch 109. The primary function of control circuit 67 is to cause sequential operation of the stepping switches at the proper time.

The structural arrangement of the remainder of control circuit 67 can best be explained in conjunction with a description of operation of the batcher. To start operation, a main switch 110 is closed to supply power to transformers 24 and 111. This energizes load cells 20 and 44, zero balancing circuits 30 and 46, cut-off circuits 32 and 48, and dribble voltage circuits 34 and 50. Assuming that weighing system 10 is to be adjusted to compensate for tare weight, the movable contact of potentiometer 75 in zero balancing circuit 30 is adjusted until zero voltage appears at the input of the amplifier, as indicated by zero balance meter 66, when selector switch 62 is in its upper position and when the movable blade 54 of stepping switch 52 engages fixed contact 60.

Likewise with selector switch 62 in its lower position the potentiometer in zero balance circuit 46 is adjusted until meter 66 reads zero to thereby indicate that any tare weight has been compensated in weighing system 12. It will be noted that the cut-off circuits and dribble circuits of the weighing systems are ineffective in supplying any voltage to the amplifier when selector switch 62 and stepping switch 52 are positioned as described above.

The pre-selected weight of the first ingredient which is to be delivered to hopper 14 is determined by the magnitude of the opposing voltage created in cut-off circuit 32. The magnitude of this voltage is controlled by adjusting wiper 88 of potentiometer 86. A graduated chart (not shown in the drawings) is associated with the movable contact 88 of potentiometer 86 so that a visual indication of the pre-selected weight is obtained.

For purposes of explanation it will be assumed that 400 lbs. of the first ingredient are to be delivered to hopper 14, and it will be further assumed that the last 10 lbs. are to be delivered at a dribble rate. Thus, cut-off circuit 32 will be adjusted to produce a voltage representative of 400 lbs. and dribble circuit 34 will be adjusted to produce a dribble voltage equal to 10 lbs.

The amount of the second ingredient which is to be delivered to hopper 38 is determined by the adjustment of cut-off circuit 48. Likewise the quantity of second ingredient which is to be delivered at the dribble rate is controlled by the adjustment of dribble circuit 50. As an example, it will be assumed that 1.7 lbs. of the second ingredient are required and that 0.2 lb. are to be delivered at the dribble rate. Thus, cut-off circuit 48 will be adjusted until it produces a voltage representative of 1.7 lbs., and dribble circuit 50 is adjusted to produce a voltage representative of the 0.2 lb.

After these adjustments are made automatic operation of the batcher is accomplished by momentarily depressing start button 112. When the start button is closed, line voltage from source 150 is applied between conductors 114 and 116. A relay coil 118, controlling contacts 118', 118" and 118''', is connected in series with normally open contacts 120 between these conductors. Contacts 120 are parallel by a series arrangement of normally open contacts 118' and normally closed contacts 122 of microswitch 109. Thus, it will be seen that relay coil 118 will be energized when contacts 120 are closed, and the coil will then remain energized since contacts 118' are closed upon energization of the coil 118 to produce a holding circuit through contacts 118' and contacts 122. Coil 118 is also provided with a second set of contacts 118" which are in series with the control windings of motor 104. Therefore, when coil 118 is energized, motor 104 will be rendered operative. In addition, normally closed contacts 118''' which are connected in series with the parallel energizing paths for valves 16, 18, 40 and 42 are opened by energization of coil 118.

Contacts 120 form a part of balance detector 71 and are closed whenever a balanced voltage condition prevails, so that the input voltage signal to the amplifier is of zero amplitude. Whenever an unbalance of voltages exists at the input to the amplifier, contacts 120 will be open. The particulars of the amplifier and balance detector do not form a part of the present invention and therefore are not shown. For details of a typical balance detector reference may be had to the above identified copending application.

When stepping switch 52 has its movable contact in engagement with fixed contact 60, the amplifier input winding 56 is not connected to either weighing system 10 or 12 and there is no input signal to the amplifier. Thus, upon closing start button 112, since contacts 120 are closed by balance detector 70 to indicate zero error signal, relay coil 118 is energized to actuate motor 104 and at the same time close a holding circuit through contacts 118' and 122. Therefore, motor 104 will operate to move arm 54 of stepping switch 52 into engagement with fixed contact 69. With the switch in this position the entire series circuit arrangement of weighing system 10 including load cell 20, zero balancing circuit 30, cut-off circuit 32 and dribble circuit 34 are connected in series with amplifier input winding 56. With the example selected above, this produces an unbalanced voltage at the amplifier input equal to 400 lbs. less 10 lbs. (390 lbs. of error signal).

Upon sensing this unbalance, balance detector 71 causes contacts 120 to open and remain open until another balanced condition of voltages from weighing system 10 is produced. As motor 104 operated to step switch 52 from one position to the next, it caused contacts 122 of the holding circuit to coil 118 to be momentarily opened.

Contacts 122 are schematically shown as a cam-operated switch of the microswitch type. Since contacts 122 are arranged to be opened just before blade 54 of switch 52 reaches contact 69, coil 118 will be de-energized and remain de-energized, because balance detector contacts 120 are also now open due to the unbalance of voltages impressed on the amplifier and the holding circuit for coil 118 is interrupted. Contacts 118''' are closed upon de-energization of coil 118. At the same time that switch 52 is operated, switch 102 is also stepped to cause its blade to move from an initial fixed contact 124 to the next contact 126. Thus main feed solenoid 16 will be energized to start material feed into hopper 14 over a circuit extending from one side of voltage source 150, over the contacts of switch 110, the bypass circuit around switch 112, over conductor 114, contacts 118''', the winding of solenoid 16, contacts 126 and the wiper of switch 102 and conductor 116 to the other side of voltage source 150.

As the first ingredient feeds into its hopper, the error signal will be gradually reduced until exactly 390 lbs. are in the hopper at which time the several voltages of weighing system 10 are balanced. Upon reaching this voltage balance, contacts 120 of the balance detector close. This in turn energizes coil 118 to operate motor 104 and step the switch blades to their next positions. When coil 118 was energized, its holding circuit was closed and remained closed until contacts 122 momentarily opened to indicate that the motor had operated sufficiently to place the switch blades in their next position.

While blade 54 engaged contact 69, the dribble circuit 34 was rendered effective, but when the blade engages contact 68 only load cell 20, zero balance circuit 30 and cut-off circuit 32 are connected in series and the dribble circuit 34 does not supply any voltage to amplifier 58. Hence, a voltage unbalance equal to 10 lbs. exists, since the load cell voltage equals 390 lbs. (the weight of material in the hopper) and the opposing voltage of the cut-off circuit equals 400 lbs. This unbalanced voltage condition opens contacts 120 so that the stepping switches will not operate again until another balanced voltage condition prevails.

Switch 102 had its blade stepped to engagement with fixed contact 128 to complete an obvious energizing circuit for dribble solenoid 18 which circuit extends from a source of A. C. current 150 over conductor 116, the wiper and contacts 128 of switch 102, the winding of coil 18, contacts 118''', conductor 114, normally closed contacts of stop switch 134, contacts 136', normally closed contacts 138' and power switch 110 to the A. C. current supply 150. Hence, the last 10 lbs. of the first ingredient will dribble into the hopper. At this time another voltage balance prevails and balance detector contacts 120 will close to step the switches again.

Upon reaching contacts 72 blade 54 will connect weighing system 12 to amplifier 58 and stepping switch 102 will energize main feed solenoid 40 for the second ingredient. Thus, load cell 44, zero balance circuit 46, cut-off circuit 48 and dribble circuit 50 will be series connected to supply an error signal representative of 1.5 lbs. (1.7 lbs. of cut-off voltage less .2 lb. of dribble voltage). After the second ingredient, which is delivered by main solenoid valve 40, reaches a weight of 1.5 lbs. in the hopper 38 a voltage balance exists. This balance effects closure of contacts 120 to re-operate the stepping switches.

The blade of switch 102 engages contact 132 to energize dribble solenoid 42 and start the slow feed of the second ingredient. Simultaneously blade 54 engages contacts 74 to render the dribble circuit 50 ineffective. Since only 1.5 lbs. of material is in the hopper and the cut-off circuit is adjusted to represent 1.7 lbs., an unbalance voltage of .2 lb. exists. When the final .2 lb. has dribbled into hopper 38, the balance of voltages causes the balance detector contacts 120 to close and step switches 52 and 102 back to their initial positions to terminate the weighing cycle.

A parallel circuit arrangement is provided around start button 112 so that the batcher remains in operation even after the start button is released. A stop button 134, normally open contacts 136', and normally closed contacts 138' are provided. Contacts 136' are closed by coil 136 at all times during which the batcher is operative, i. e., after start button 112 has been closed. Contacts 138' are opened by energization of coil 138 which is effected only when stepping switch 102 is in its initial position.

Hence, after start button 112 is closed, even momentarily, the weighing operation can be stopped at any time by opening stop button 134. Also at the completion of the batching operation when the stepping switches return to this starting position, coil 138 will be energized to open contacts 138' in the parallel path around the start button and stop all operation so that the stepping switches remain in their initial position until the start button is again pressed.

In order to cut off any material feed when the stepping switches are moving from one position to the next, contacts 118''' are provided in series between the valve solenoids and lead 114. Since coil 118 is energized whenever stepping operation is underway, the valves will be held positively inoperative at these times.

From the foregoing, it should be evident that we have provided a new and novel batching system as defined in the appended claims.

We claim:

1. In a batch weigher, a first electrical weighing system including a first hopper for weighing a first ingredient, first valve means controlling the flow of the first ingredient to said first hopper, a second electrical weighing system including a second hopper for weighing a second ingredient, second valve means for controlling the flow of the second ingredient to said second hopper, a control circuit for said batch weigher, an amplifier operatively associated with said control circuit to control the weighing operation of said weighing systems, and switch means in said control circuit operable to connect said amplifier to said first weighing system and actuate said first valve means during weighing operation of said first weighing system and then to connect said amplifier to said second weighing system and actuate said second valve means during weighing operation of said second weighing system.

2. In a batch weigher, a first electrical weighing system for weighing a first ingredient, a second electrical weighing system for weighing a second ingredient; each weighing system including a hopper, means for producing a first voltage representative of the weight of the material carried by said hopper, means for producing a second voltage proportional to the weight of a desired predetermined quantity of material to be received by said hopper; first valve means for delivering said first ingredient to the hopper of said first system, second valve means for delivering said second ingredient to the hopper for said second system, means for sensing the relationship between said first and second voltages of each of said systems and for controlling the delivery of material to said hoppers, and sequence switching means for connecting said sensing means first to said first weighing system and then to said second weighing system.

3. In a batch weigher, a first electrical weighing system for weighing a first ingredient, a second electrical weighing system for weighing a second ingredient; each weighing system including a hopper, means for producing a first voltage representative of the weight of the material carried by said hopper, means for producing a second voltage proportional to the weight of a desired predetermined quantity of material to be received by said hopper; first valve means for delivering said first ingredient to the hopper of said first system, second valve means for delivering said second ingredient to the hopper of said second system, switch means to first actuate said first valve means and deliver said predetermined amount of said first ingredient to the hopper of said first system and then actuate said second valve means and deliver said predetermined amount of said second ingredient to the hopper of said second system, and a control circuit for sensing the relationship between said first and second voltages in each of said systems, said control circuit being arranged to operate said switch means.

4. In a batch weigher, a first electrical weighing system for weighing a first ingredient, a second electrical weighing system for weighing a second ingredient; each weighing system including a hopper, means for producing a first voltage representative of the weight of the material carried by said hopper, means for producing a second voltage proportional to the weight of a desired predetermined quantity of material to be received by said hopper, means for producing a third voltage in phase with said first voltage and proportional to the weight of a certain fraction of said predetermined weight of material; first valve means for delivering said first ingredient to the hopper of said first system, second valve means for delivering said second ingredient to the hopper of said second system, voltage balance detector means, control circuit means operatively associated with said detector means, and switch means operated by said control circuit means to cause weighing operation of said first system with said third voltage first effective and then ineffective and then cause weighing operation of said second system with the third voltage first effective and then ineffective.

5. In a batch weigher, a first electrical weighing system for weighing a first ingredient, a second electrical weighing system for weighing a second ingredient; each weighing system including a hopper, means for producing a first voltage representative of the weight of the material to be received by said hopper, means for producing a second voltage proportional to the weight of a desired predetermined quantity of material to be received by said hopper; first valve means for delivering said first ingredient to the hopper of said first system, second valve means for delivering said second ingredient to the hopper for said second system, a voltage balance detector circuit, switch means adapted in a first position to connect said balance detector to said first weighing system and operate said first valve means to deliver said first ingredient to the hopper for the first system and adapted in a second position to connect said balance detector to said second weighing system and operate said second valve means to deliver said second ingredient to the hopper for the second system, and control circuit means operated from said balance detector circuit to sequentially operate said switch means.

6. In a batch weigher, a first electrical weighing system for weighing a first ingredient, a second electrical weighing system for weighing a second ingredient; each weighing system including a hopper, means for producing a first voltage representative of the weight of the material to be received by said hopper, means for producing a second voltage proportional to the weight of a desired predetermined quantity of material to be received by said hopper; first valve means for delivering said first ingredient to the hopper of said first system, second valve means for delivering said second ingredient to the hopper for said second system, a balance detector to sense the relationship of said first and second voltages of said weighing systems, stepping switch means actuatable to connect said balance detector first to said first system and operate said first valve means and then connect said balance detector to said second system and operate said second valve means, and control means operated from said balance detector to actuate said stepping switch means.

References Cited in the file of this patent

UNITED STATES PATENTS

| | | |
|---|---|---|
| 2,109,534 | Johnson | Mar. 1, 1938 |
| 2,199,010 | Robb | Apr. 30, 1940 |
| 2,336,130 | Saxe | Dec. 7, 1943 |
| 2,431,058 | Manning | Nov. 18, 1947 |
| 2,564,221 | Hornfeck | Aug. 14, 1951 |
| 2,650,057 | Goland et al. | Aug. 25, 1953 |